D. L. GEER.
Rice Cleaners.
No. 142,158. Patented August 26, 1873.
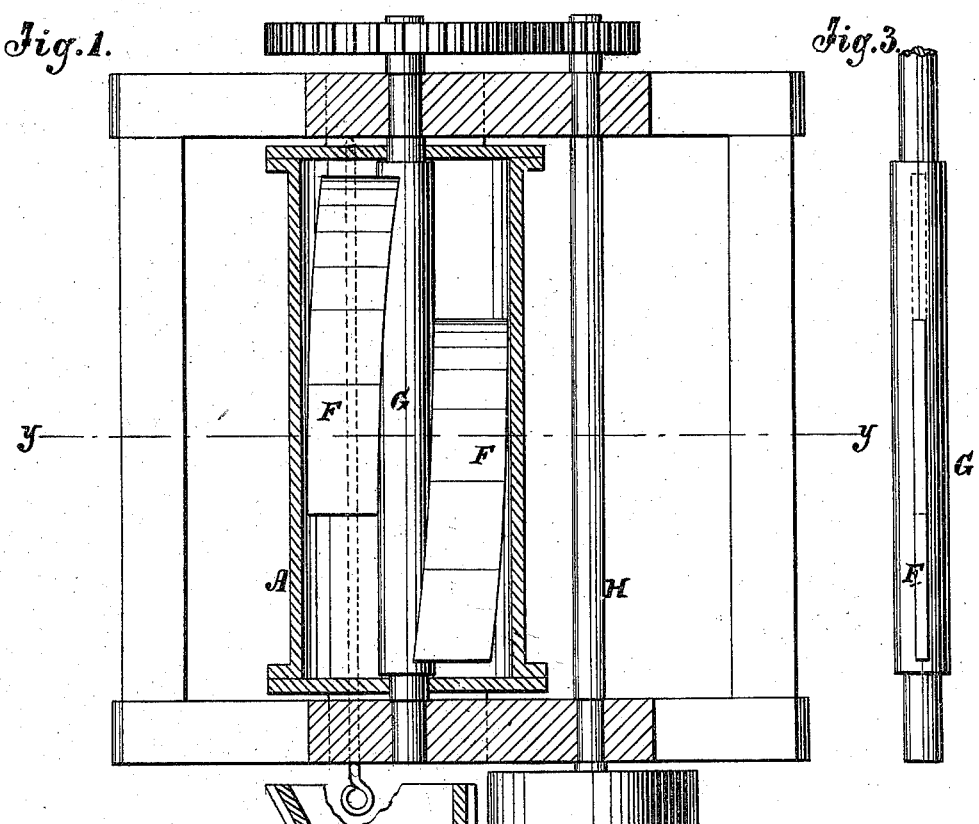
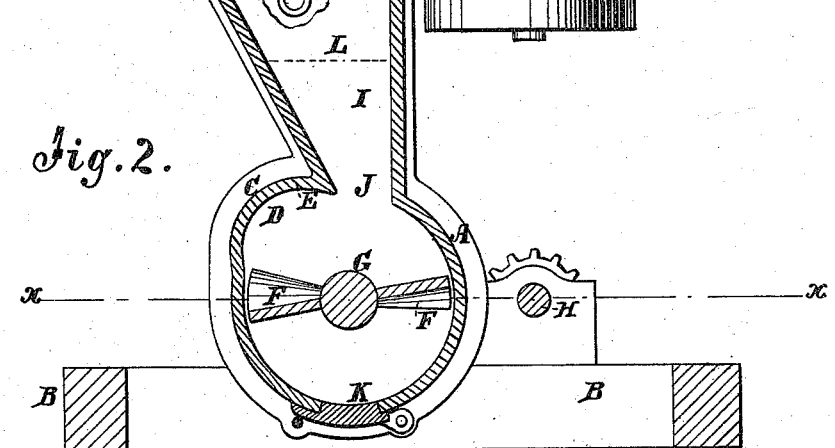
Witnesses:
Inventor:

UNITED STATES PATENT OFFICE.

DAVID L. GEER, OF LAKE CITY, FLORIDA.

IMPROVEMENT IN RICE-CLEANERS.

Specification forming part of Letters Patent No. 142,158, dated August 26, 1873; application filed May 5, 1873.

*To all whom it may concern:*

Be it known that I, DAVID L. GEER, of Lake City, in the county of Columbia and State of Florida, have invented a new and Improved Rice-Cleaner, of which the following is a specification:

My invention consists, first, in the rotating shaft of the machine, with blades so arranged spirally, and turned in opposite directions, as to throw the grain upward and backward and forward; and, secondly, in providing the cylinder into which the grain is delivered with a bulge, which forms a cavity wherein the grain is forced by the spiral blades, thereby effecting the hulling, as hereinafter described.

Figure 1 is a horizontal section of the machine taken on the line $x\, x$, Fig. 2. Fig. 2 is a transverse section taken on the line $y\, y$ of Fig. 1, and Fig. 3 is a side elevation of the shaft and beating blades, showing a slight modification of the arrangement of the blades.

A is the hollow cylinder, which is arranged in a horizontal position on a suitable bench or table, B. It is cylindrical in cross-section, except at C, where it has a bulge extending from end to end, forming a cavity, D, whose upper wall E is nearly horizontal, so that the grain will be driven against it with great force by the blades F, which are turned in a direction to throw the grain upward toward it. The blades are, in this example, two in number—one on each of the opposite sides of the shaft G—by which they are revolved, said shaft being geared at one end with the driving-shaft H. The blades are, in length, about three-fourths that of the case, and one is placed next to one end and the other next to the other end, so as to give a forward and backward motion to the grain in the lengthwise direction of the case. They are preferably arranged spirally on the shaft, but they may be parallel, as represented in Fig. 3. I is the hopper at the top of the case for receiving the grain and conducting it into the case at J. K represents the door at the bottom of the case for discharging the grain.

In operating the machine, it is filled to the line L, so that friction is largely produced by the action of the grain upon itself set in motion by the agitators. This not only aids in removing the hulls, but facilitates the polishing of the grain, which is one of the essential objects.

Having thus described my invention, I claim as new and desire to secure by Letters Patent—

1. The blades F F, each spirally arranged on shaft at opposite ends, on opposite sides, and turned in opposite directions to throw the grain upward, backward, and forward, in the manner described.

2. The combination, with spiral grain-gathering blades F, of the cylinder A having the bulge C, as and for the purpose set forth.

DAVID L. GEER.

Witnesses:
T. B. MOSHER,
ALEX. F. ROBERTS.